(12) United States Patent
Sundararajan et al.

(10) Patent No.: US 8,219,958 B1
(45) Date of Patent: Jul. 10, 2012

(54) CREATING EVALUATION HARDWARE USING A HIGH LEVEL MODELING SYSTEM

(75) Inventors: Arvind Sundararajan, Sunnyvale, CA (US); Nabeel Shirazi, Saratoga, CA (US)

(73) Assignee: Xilinx, Inc., San Jose, CA (US)

( * ) Notice: Subject to any disclaimer, the term of this patent is extended or adjusted under 35 U.S.C. 154(b) by 183 days.

(21) Appl. No.: 12/720,563

(22) Filed: Mar. 9, 2010

(51) Int. Cl.
*G06F 17/50* (2006.01)
*G06F 9/455* (2006.01)
*G06F 11/22* (2006.01)

(52) U.S. Cl. .......... 716/121; 716/132; 716/136

(58) Field of Classification Search ........ 716/121, 716/132, 136
See application file for complete search history.

(56) References Cited

U.S. PATENT DOCUMENTS

| | | | | |
|---|---|---|---|---|
| 6,160,418 A * | 12/2000 | Burnham | | 326/38 |
| 6,535,016 B2 * | 3/2003 | Choukalos et al. | | 326/8 |
| 7,107,567 B1 * | 9/2006 | LeBlanc | | 716/106 |
| 7,183,799 B1 * | 2/2007 | Donlin et al. | | 326/38 |
| 7,184,946 B2 | 2/2007 | Ballagh et al. | | |
| 7,236,007 B1 * | 6/2007 | Chang | | 326/39 |
| 7,339,400 B1 * | 3/2008 | Walstrum et al. | | 326/41 |
| 7,550,324 B1 * | 6/2009 | Walstrum et al. | | 438/132 |
| 7,676,355 B1 * | 3/2010 | Molson et al. | | 703/14 |
| 2006/0075374 A1 * | 4/2006 | McElvain | | 716/17 |
| 2009/0164961 A1 * | 6/2009 | Goss et al. | | 716/11 |
| 2011/0113392 A1 * | 5/2011 | Chakraborty et al. | | 716/102 |
| 2011/0267095 A1 * | 11/2011 | McElvain | | 326/8 |

OTHER PUBLICATIONS

U.S. Appl. No. 12/755,760, filed Apr. 7, 2010, Sundararajan et al.

* cited by examiner

*Primary Examiner* — Suresh Memula
(74) *Attorney, Agent, or Firm* — Kevin T. Cuenot (57) ABSTRACT

Within a system comprising a processor and a memory, a method of creating evaluation hardware within an integrated circuit can include automatically inserting, by the processor, a disable circuit block into a circuit design. The method can also include automatically selecting a location within the circuit design to insert the disable circuit block, and/or inserting an unlock circuit block into the circuit design, wherein responsive to receiving an unlock code, the unlock circuit block overrides the disable circuit block. The method also can include storing, within the memory, the circuit design comprising the disable circuit block.

20 Claims, 3 Drawing Sheets

FIG. 1

```
entity disblk is
   port
      (clk              : in std_logic;
       in_signal        : in std_logic;
       disable_signal   : out std_logic;
       unlock_key       : in std_logic
      );
end disblk;
```

CREATING EVALUATION HARDWARE USING A HIGH LEVEL MODELING SYSTEM

FIELD OF THE INVENTION

The embodiments disclosed within this specification relate to integrated circuit devices (ICs). More particularly, the embodiments relate to creating evaluation hardware for an IC using a high level modeling system.

BACKGROUND

A high level modeling system (HLMS) is a computer-based, circuit design tool that allows a user to create a circuit design at a high level of abstraction. An HLMS provides a design environment within which the user creates circuit designs using a modular approach. Typically, the HLMS provides a graphic design environment in which circuit blocks are inserted into the circuit design using a "drag-and-drop" design paradigm, though command line options are usually available as well. The user can drag circuit blocks, represented as graphic blocks, into the design environment. Each circuit block can represent a particular circuit function such as multiplexing, addition, multiplication, filtering, or the like. The user also can specify connectivity and signal flows within the circuit design by coupling exposed ports of circuit blocks by drawing lines, representing wires, coupling the ports. The user effectively builds an electronic circuit design by constructing a block diagram.

In addition to being used to create user-specified circuit designs, an HLMS can be used by a provider of intellectual property (IP) to generate circuit designs that can be licensed to third parties. To facilitate the licensing process, it is necessary for the IP provider to make a version of the circuit design available to potential licensees for evaluation. Typically, protective mechanisms are placed into the circuit design by the provider to prevent potential licensees from having unfettered use of the circuit after expiration of a trial period. At the conclusion of the trial period, with the circuit design being implemented in hardware as a circuit, the protective mechanism typically renders the circuit unusable.

Creation of an evaluation version of a circuit design is a manual process that can be both time consuming and complicated. The designer must manually incorporate the protective mechanisms within the circuit design to be evaluated and make any necessary signal connections or modifications.

SUMMARY

The embodiments disclosed within this specification relate to integrated circuit devices (ICs). More particularly, the embodiments relate to creating evaluation hardware for an IC using a high level modeling system. One embodiment of the present invention can include a method of creating evaluation hardware within an integrated circuit using a system comprising a processor and a memory. The method can include automatically inserting, by the processor, a disable circuit block into a circuit design and storing, within the memory, the circuit design comprising the disable circuit block.

The method can include selecting the disable circuit block to specify an electronic circuit that passes a received signal as an output signal while a number of received clock cycles does not exceed a threshold and outputs a static disable signal when the number of received clock cycles exceeds the threshold.

Automatically inserting can include automatically selecting a location within the circuit design to insert the disable circuit block. In one aspect, automatically inserting can include selecting at least one clock enable signal within the circuit design and inserting the disable circuit block on each selected clock enable signal within the circuit design. In another aspect, automatically inserting can include selecting at least one of an input port or an output port within the circuit design and inserting the disable circuit block on each selected port.

Automatically inserting further can include selecting a reset signal for at least one circuit element that stores state within the circuit design and inserting the disable circuit block on each reset signal. In still another aspect, automatically inserting can include sorting nets of the circuit design according to fanout, selecting a predetermined number of nets with highest fanout, and inserting the disable circuit block on at least one signal of each selected net.

An unlock circuit block also can be inserted into the circuit design. Responsive to receiving an unlock code, the unlock circuit block can override the disable circuit block.

Another embodiment of the present invention can include a system that creates evaluation hardware. The system can include a memory storing program code and a processor coupled to the memory and executing the program code. The processor can perform executable steps including automatically inserting a disable circuit block into the circuit design and storing, within the memory, the circuit design comprising the disable circuit block.

The processor further can perform an executable step including selecting the disable circuit block to specify an electronic circuit that passes a received signal as an output signal while a number of received clock cycles does not exceed a threshold and outputs a static disable signal when the number of received clock cycles exceeds the threshold.

The processor can perform an executable step including automatically selecting a location within the circuit design to insert the disable circuit block. Automatically inserting can include selecting at least one clock enable signal within the circuit design and inserting the disable circuit block on each selected clock enable signal within the circuit design. In another aspect, automatically inserting can include selecting at least one of an input port or an output port within the circuit design and inserting the disable circuit block on each selected port.

Automatically inserting also can include selecting a reset signal for at least one circuit element that stores state within the circuit design and inserting the disable circuit block on each reset signal. In still another aspect, automatically inserting can include sorting nets of the circuit design according to fanout, selecting a predetermined number of nets with highest fanout, and inserting the disable circuit block on at least one signal of each selected net.

Another embodiment of the present invention can include a device comprising a data storage medium usable by a system comprising a processor and a memory. The data storage medium can store program code that, when executed by the system, causes the system to execute operations. The operations can include automatically inserting a disable circuit block into the circuit design and storing, within the memory, the circuit design comprising the disable circuit block.

Automatically inserting can include selecting at least one clock enable signal within the circuit design and inserting the disable circuit block on each selected clock enable signal within the circuit design. In another aspect, automatically inserting can include selecting at least one of an input port or an output port within the circuit design and inserting the disable circuit block on each selected port.

Automatically inserting further can include selecting a reset signal for at least one circuit element that stores state within the circuit design and inserting the disable circuit block on each reset signal. In still another aspect, automatically inserting can include sorting nets of the circuit design according to fanout, selecting a predetermined number of nets with highest fanout, and inserting the disable circuit block on at least one signal of each selected net.

DETAILED DESCRIPTION

While the specification concludes with claims defining the features of the embodiments of the invention that are regarded as novel, it is believed that the embodiments of the invention will be better understood from a consideration of the description in conjunction with the drawings. As required, detailed embodiments of the present invention are disclosed herein; however, it is to be understood that the disclosed embodiments are merely exemplary of the inventive arrangements, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the embodiments of the invention.

The embodiments disclosed within this specification relate to integrated circuit devices (ICs). More particularly, the embodiments relate to creating evaluation hardware for an IC using a high-level modeling system (HLMS). In accordance with the inventive arrangements disclosed within this specification, an HLMS can be configured to automatically insert a disabling mechanism into a circuit design to generate an evaluation version of the circuit design. In one aspect, the type of disabling mechanism can be selected in addition to the particular location within the circuit design at which the disabling mechanism is to be placed. The HLMS can automatically insert the disabling mechanism and establish any necessary signal couplings.

The resulting circuit design, comprising the disabling mechanism, can be output and stored as an evaluation version of the circuit design. When the circuit design is ultimately instantiated or otherwise created within an IC as hardware, the circuit specified by the evaluation circuit design will be disabled according to the particular process or technique utilized by the disabling mechanism inserted therein. Thus, the evaluation circuit design, when implemented in hardware, will only operate in accordance with the restrictions and/or limitations implemented by the disabling mechanism.

Figure 1:
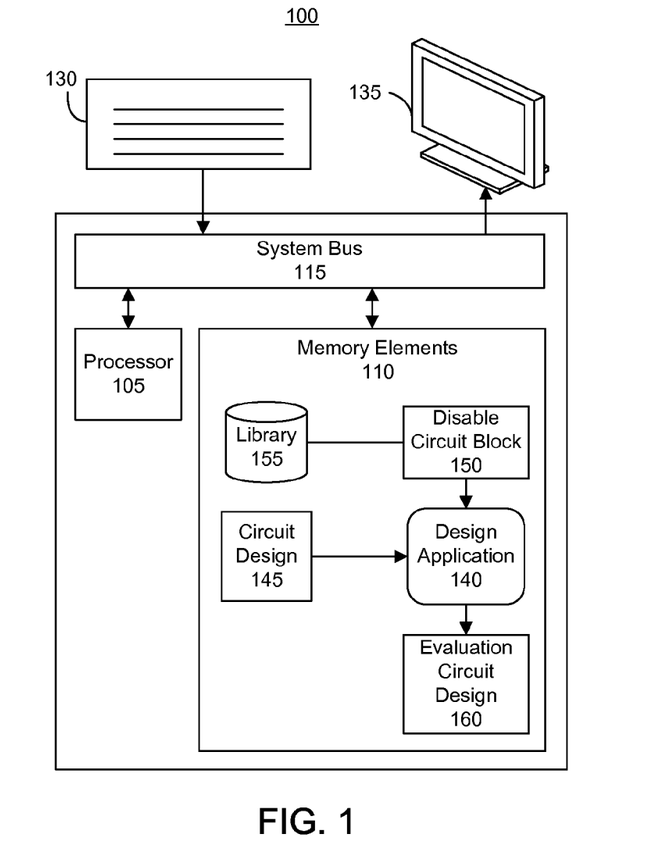
FIG. 1 is a first block diagram illustrating a high level modeling system for generating an electronic system in accordance with one embodiment of the present invention.

FIG. 1 is a first block diagram illustrating an HLMS 100 for generating an electronic system in accordance with one embodiment of the present invention. In one aspect, HLMS 100 can generate one or more circuit designs for instantiation within, or implementation as, an IC. The circuit designs that are generated can be instantiated within an IC, whether the IC is programmable or not. In generating circuit designs, HLMS 100 can insert a disabling mechanism in the form of one or more disable blocks within the circuit design to create an evaluation circuit design.

Programmable ICs are a well-known type of IC that can be programmed to perform specified logic functions. Examples of programmable ICs can include, but are not limited to, field programmable gate arrays (FPGAs), complex programmable logic devices (CPLDs), and mask programmable devices. The phrase "programmable IC" refers to the ICs noted herein and ICs that are only partially programmable. For example, another type of programmable IC includes a combination of hard-coded transistor logic and a programmable switch fabric that programmably interconnects the hard-coded transistor logic.

Some types of programmable ICs, such as FPGAs and CPLDs, are programmed by providing data bits to the device for the purpose of configuring the device. The programmable IC is configured, by loading the data bits, to implement or instantiate a particular electronic system or circuit specified by the data bits. The data bits provided to the programmable IC for the purpose of configuration also can be referred to as configuration data and, in some cases, a bitstream.

Turning again to FIG. 1, HLMS 100 can include at least one processor 105 coupled to memory elements 110 through a system bus 115. As such, HLMS 100 can store program code within memory elements 110. Processor 105 can execute the program code accessed from memory elements 110 via system bus 115. In one aspect, for example, HLMS 100 can be implemented as a computer that is suitable for storing and/or executing program code. It should be appreciated, however, that HLMS 100 can be implemented in the form of any system comprising a processor and memory that is capable of performing the functions described within this specification.

Memory elements 110 can include one or more physical memory devices such as, for example, local memory and one or more bulk storage devices. Local memory refers to random access memory or other non-persistent memory device(s) generally used during actual execution of the program code. Bulk storage device(s) can be implemented as a hard drive or other persistent data storage device. System 100 also can include one or more cache memories that provide temporary storage of at least some program code in order to reduce the number of times program code is retrieved from the bulk storage device during execution.

Input/output (I/O) devices such as a keyboard 130, a display 135, and a pointing device (not shown) optionally can be coupled to HLMS 100. The I/O devices can be coupled to HLMS 100 either directly or through intervening I/O controllers. Network adapters also can be coupled to HLMS 100 to enable HLMS 100 to become coupled to other systems, computer systems, remote printers, and/or remote storage devices through intervening private or public networks. Modems, cable modems, and Ethernet cards are examples of different types of network adapters that can be used with HLMS 100.

As pictured in FIG. 1, memory elements 110 can store program code in the form of a high level circuit design application (design application) 140. Design application 140, being implemented in the form of executable program code, causes processor 105 to perform the functions described within this specification and enables functionality of HLMS 100. In general, design application 140 can be used to specify an electronic system, such as a circuit design, at a high level of abstraction. Design application 140 can provide the instructions necessary to implement the design environment that is characteristic of an HLMS, in general, and thus, facilitates block level circuit design where each block represents a circuit function.

In operation, a circuit design 145 can be loaded into HLMS 100. HLMS 100, executing design application 140, can select a disable circuit block 150 from a library 155 of circuit blocks. Library 155 can include a variety of different circuit blocks including a plurality of different types of disable circuit blocks available for inclusion within circuit designs. It should be appreciated that while library 155 is illustrated as being stored within memory elements 110, library 155 also can be stored within a remote data storage device, within a different computer system, etc. Library 155 is shown as being stored within memory elements 110 for purposes of illustration.

Design application 140, having selected disable block 150, can insert disable block 150 into circuit design 145. Accordingly, the resulting circuit design, denoted as evaluation circuit design 160, can be output and stored within memory elements 110. Evaluation circuit design 160 is, in general, circuit design 145 with disable circuit block 150 included therein. Design application 140 can automatically insert disable circuit block 150 into circuit design 145 and establish and/or create any necessary signal couplings to effectuate the inclusion of disable circuit block 150 into circuit design 145.

Disable circuit block 150 can specify the hardware, e.g., circuitry, and signals that disable circuit design 145. In one embodiment, for example, disable circuit block 150 can specify hardware description language defining a particular implementation of the disable mechanism represented by disable circuit block 150.

Figure 2:
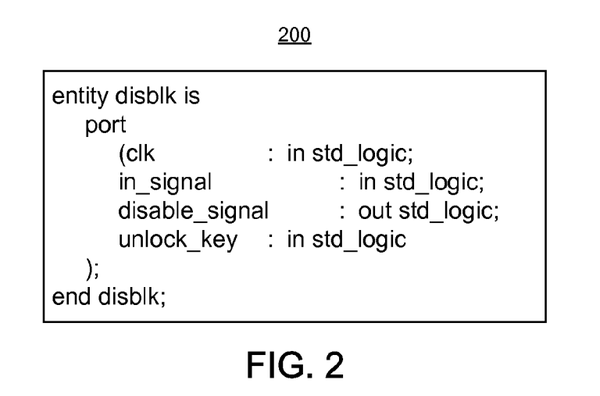
FIG. 2 is first listing of program code illustrating a port interface of a disable circuit block in accordance with another embodiment of the present invention.

FIG. 2 is first listing of program code illustrating a port interface 200 of a disable circuit block in accordance with another embodiment of the present invention.

FIG. 2 illustrates an embodiment in which the disable circuit block selected for inclusion within the circuit design specifies a hardware description language (HDL), e.g., VHDL, implementation. More particularly, FIG. 2 illustrates an HDL description of a port interface that can be used for disable circuit block 150 of FIG. 1. Like numbers will be used to refer to the same items throughout this specification.

Within port interface 200, the entity declaration for "disblk" indicates that the port interface includes a clock signal denoted as "clk," an input signal denoted as "in_signal," an output signal denoted as "disable_signal," and optionally an unlock key signal denoted as "unlock_key." The disable signal can be used to selectively disable different circuit elements within the circuit design into which disable circuit block 150 is inserted. In one embodiment, the HLMS can couple "disable_signal" of port interface 200 incorporated into disable circuit block 150 to components of circuit design 145 that, if disabled, effectively render evaluation circuit design 160 inoperable.

Within this specification, the same reference characters are used to refer to terminals, pins, wires, signal lines representing wires of a circuit design within an HLMS, and their corresponding signals. In this regard, the terms "signal," "wire," "connection," "terminal," and "pin" may be used interchangeably, from time-to-time, within this specification. It also should be appreciated that the terms "signal," "wire," or the like can represent one or more signals, e.g., the conveyance of a single bit, or a plurality of bits sent serially, through a single wire or the conveyance of multiple parallel bits through multiple parallel wires. Further, each wire or signal may represent bi-directional communication between two, or more, elements connected by a signal or wire as the case may be.

Figure 3:
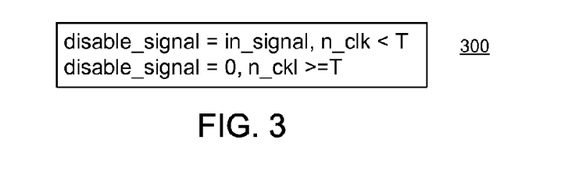
FIG. 3 is second listing of program code illustrating an architectural description of a disable circuit block in accordance with another embodiment of the present invention.

FIG. 3 is second listing of program code illustrating an architectural description 300 of a disable circuit block in accordance with another embodiment of the present invention. Architectural description 300, which in this example is specified in HDL, illustrates an example of the functionality and circuitry that can be specified by disable circuit block 150.

As illustrated, the state of "disable_signal" can be defined in terms of the state of a counter that counts clock cycles. The term "n_clk" represents the count, and thus, the output signal of a counter that counts the number of rising clock edges encountered. While the value of "n_clk" is less than a predetermined value specified by the term "T," "disable_signal" is set equal to "in_signal." Thus, "in_signal" is effectively passed as the output signal of disable circuit block 150 while the term "n_clk" is less than the value specified for "T." When the term "n_clk" is greater than or equal to the term "T," "disable_signal" is set to zero. Thus, when the value of "n_clk" exceeds the value of "T," the input signal is effectively zeroed in that the signal output from disable circuit block 150, e.g., "disable_signal," is no longer the same as "in_signal."

Consider the case in which disable circuit block 150 is inserted on a clock enable signal. Thus, the input signal to disable circuit block 150 is a clock enable signal. In the example pictured in FIG. 3, disable circuit block 150 continues to output the clock enable signal as "disable_signal" while "n_clk" is less than the value specified by "T." When "n_clk" is equal to, or exceeds, the value specified by "T," "disable_signal" is set to zero. Thus, the clock enable signal is held static, thereby disabling circuit elements that maintain state and are coupled to the now disabled clock enable signal.

Figure 4:
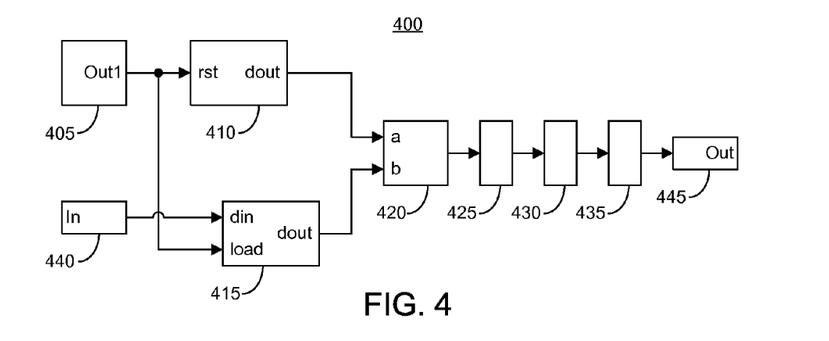
FIG. 4 is a second block diagram illustrating an unlock circuit block in accordance with another embodiment of the present invention.

FIG. 4 is a second block diagram illustrating an unlock circuit block 400 in accordance with another embodiment of the present invention. The unlock circuit block 400 illustrated in FIG. 4 can be used in an embodiment in which the disable circuit block is permanently embedded within the circuit design. In that case, the circuit design that is generated as the evaluation version and the "regular," e.g., non-evaluation version, can be identical. The evaluation circuit design can be transformed into the "regular" circuit design through inclusion of unlock circuit block 400 within evaluation circuit design 160 and by providing unlock circuit block 400, when instantiated within the IC, within a particular code that effectively overrides, e.g., disables, disable circuit block 150.

Unlock circuit block 400 illustrates an embodiment of an unlock circuit that utilizes maximal codes and linear feedback shift registers (LFSRs). Unlock circuit block 400 includes a maximal length signal generator 405, a pre-initialized LFSR 410, a user key LFSR 415, exclusive OR 420, and a plurality of registers 425, 430, and 435. The user-supplied unlock key can be provided through unlock key port 440 to LFSR 415. Unlock key port 440 can be an input port at the top level of the circuit design within which unlock circuit block 400 is to be inserted.

LFSR 410 can be pre-initialized with a maximal code length generated by maximal length signal generator 405. The unlock key can be provided to user key LFSR 415 via unlock key port 440. If, and only if, the unlock key, which in this case is the maximal code length passed to pre-initialized LFSR 410, is passed into unlock key port 440, will exclusive OR 420 generate a constant stream of one that passes through registers 425-435 to output port 445.

In one embodiment, the signal generated by output port 445 can be provided to enable the clock enable generator. In another embodiment, unlock circuit block 400 can be utilized in coordination with, or within, a disable circuit block, e.g., disable circuit block 150. In any case, it should be appreciated that unlock circuit block 400 is provided as a non-limiting example of an unlock circuit or system that can be used within one or more of the embodiments described within this specification. As such, other unlock circuit blocks that utilize other technologies or techniques can be used in lieu of unlock circuit block 400.

Disable hardware can be specified using any of a variety of different formats that are understandable to, or that can be processed by, the HLMS. Disable hardware that conforms to a standardized interface, e.g., the port interface illustrated in FIG. 2, also can be designed by a hardware designer. As illustrated, the disable hardware, whether standard circuit blocks that are part of the HLMS or a custom circuit design created by a designer, can be incorporated into a library of circuit blocks. In the event that the designer wishes to choose the particular disable mechanism that is to be used, the designer of evaluation circuit design 160 can select a disable circuit block already incorporated within the library or provide an input specifying a reference to a particular disable circuit block not included within the library.

Figure 5:
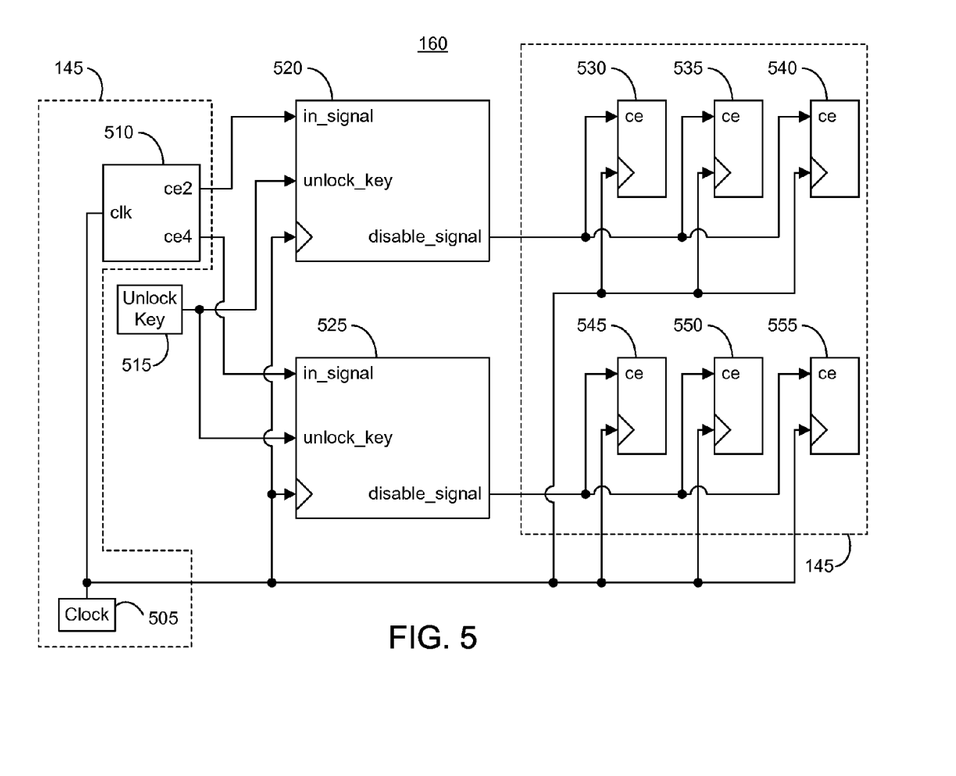
FIG. 5 is block diagram of an evaluation circuit design in accordance with another embodiment of the present invention.

FIG. 5 is a block diagram of an evaluation circuit design in accordance with another embodiment of the present invention. More particularly, FIG. 5 illustrates an example of evaluation circuit design 160 of FIG. 1. Thus, the HLMS has selected a particular disable circuit block and automatically inserted the disable circuit block within circuit design 145 to create evaluation circuit design 160. For ease of illustration, data signals within circuit design 145 have been omitted.

In the example pictured in FIG. 5, the disable circuit blocks are depicted as circuit blocks 520 and 525. Circuit blocks 520 and 525 have been selected and inserted on the clock enable signals that are generated by a clock enable generator 510 and provided to stateful elements of circuit design 145. Clock enable generator 510 is a standard circuit block available within commercially available HLMSs that generates clock enable signals. As shown, clock enable generator 510 receives a clock signal from clock 505. Clock enable generator 510 can output a first clock enable signal from output "ce2" and a second clock enable signal from output "ce4". Output "ce2" is coupled to the "in_signal" input of circuit block 520. Output "ce4" is coupled to the "in_signal" input of circuit block 525.

Without inclusion of circuit block 520, output "ce2" would be coupled directly to the clock enable "ce" input of each of circuit blocks 530, 535, and 540 of circuit design 145. Similarly, without inclusion of circuit block 525, output "ce4" would be coupled directly to the clock enable "ce" input of each of circuit blocks 545, 550, and 555 of circuit design 145.

Each of circuit blocks 520 and 525 can incorporate aspects of the embodiments described within this specification with reference to FIGS. 1-4. For example, circuit blocks 520 and 525 each can include a counter that counts clock cycles on the clock signal generated by clock source 505. While the count of the counter is less than the predetermined threshold "T," the signal received at the "in_signal" input of each of circuit blocks 520 and 525 can be output from the "disable_signal" output of each of circuit blocks 520 and 525. When the count of the counter is greater than or equal to the threshold "T," the signal output from the "disable_signal" output of each of circuit blocks 520 and 525 can be a static signal that is held at zero, one, or some voltage between.

Each of circuit blocks 520 and 525 can include an input called "unlock_key" that is coupled to unlock key port 515, which is a port through which the unlock key can be provided to evaluation circuit design 160. As discussed, providing the unlock key to each of circuit blocks 520 and 525 can unlock evaluation circuit design 160 and override the disable mechanism included within each of circuit blocks 520 and 525. As described, providing the unlock key to the "unlock_key" input of each of circuit blocks 520 and 525, overrides the disable mechanism and allows each of circuit blocks 520 and 525 to continue to output, from the "disable_signal" output, the signal received at the "in_signal" input regardless of whether the count of the counter is greater than or equal to the threshold "T."

Accordingly, when each of circuit blocks 520 and 525 pass the signal received at input "in_signal" from the output "disable_signal," circuit design 145 will continue to operate. When each of circuit blocks 520 and 525 hold the signal output from output "disable_signal" static, circuit design 145 becomes inoperable, since stateful circuit blocks 520-555 can no longer operate.

FIG. 5 illustrates one technique for inserting disable circuit blocks into a circuit design. In another embodiment, disable circuit blocks can be inserted on reset signals. By keeping stateful elements of circuit design 145, whether most or all such elements, in a reset state, evaluation circuit design 160, when instantiated within an IC is rendered inoperable. In still another embodiment, disable circuit blocks can be inserted on data-in ports or data-out ports of circuit design 145. For example, within selected HLMSs, a gateway in and/or a gateway out block can be used to indicate the input port and output port respectively of the programmable IC within which the evaluation circuit design will be instantiated. The gateway in and/or gateway out blocks can be located automatically with disable circuit blocks being inserted on one or more of the signals entering or leaving the ports represented by the gateway block(s).

In yet another embodiment, the HLMS can analyze circuit design 145 and identify the top "N" nets, where N is an integer greater than zero, having the highest fanout. For example, if N=15, the 15 nets of circuit design 145 with the highest fanout can be identified. A disable circuit block, as illustrated in FIG. 5, can be inserted into each of the N nets. This process randomizes the location of the disable circuit blocks, thereby lowering the likelihood of an adverse party finding and defeating the disable circuit blocks, within the actual hardware implementation of evaluation circuit design 160. Further, by placing the disable circuit blocks on high fanout nets, the circuit design is more likely to be disabled when the disable circuit blocks are activated.

Figure 6:
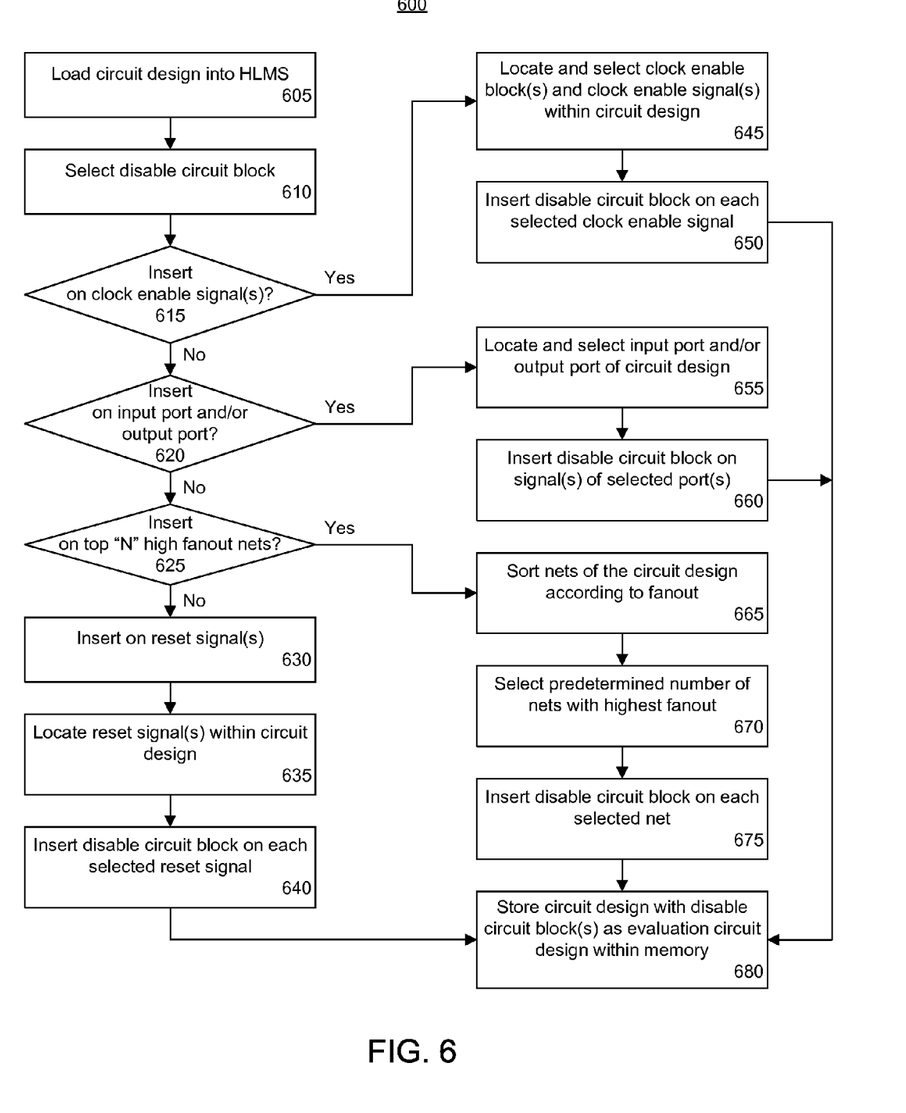
FIG. 6 is a flow chart illustrating a method of creating an evaluation version of a circuit design in accordance with another embodiment of the present invention.

FIG. 6 is a flow chart illustrating a method 600 of creating an evaluation version of a circuit design in accordance with another embodiment of the present invention. Method 600 can be performed by an HLMS as described with reference to FIGS. 1-5 of this specification. Accordingly, method 600 can begin in a state where a circuit design has been implemented that is to be converted into an evaluation circuit design and evaluation hardware. In step 605, the circuit design can be loaded into the HLMS.

In step 610, the HLMS can select a particular type of disable circuit block. In one embodiment, the HLMS can select the disable circuit block that is indicated or selected by the user. In another embodiment, the HLMS can select a particular type of disable circuit block automatically. For example, the particular type of disable circuit block that is selected can be one that does not include an unlock circuit block or one that does include an unlock circuit block according to previously established preferences.

Beginning in step 615, the HLMS can determine the technique to be used to insert the disable circuit block into the circuit design. The particular technique selected also determines the location into which the disable circuit block, or blocks, as the case may be, is to be inserted into the circuit design for creation of the evaluation circuit design. For example, as discussed, disable circuit blocks can be inserted on clock enable signals, on input ports and/or output ports, or on the top "N" high fanout nets.

The HLMS can utilize different evaluation metrics for selecting a particular technique. In one embodiment, the HLMS can determine the number of circuit elements that will be affected or rendered inoperable within the circuit design by each respective technique. The particular technique that renders the largest number of circuit blocks inoperable can be selected. In another embodiment, the technique that results in the fewest number of disable circuit blocks being inserted into the circuit design can be selected. Thus, the HLMS can select the technique to be used in steps 615-630 based upon any combination of the aforementioned criteria, predetermined user preferences, or a direct user selection.

Accordingly, in step 615, the HLMS determines whether the disable circuit block is to be inserted into the circuit design on clock enable signals. If so, method 600 can continue to step 645. If not, method 600 can proceed to step 620. Continuing with step 645, the HLMS can locate clock enable block(s) and select one or more clock enable signals generated by the clock enable block(s). In step 650, a disable circuit block can be inserted on each selected clock enable signal. In inserting the disable circuit block(s), the HLMS can make any necessary signal connections to and from each disable circuit block. After step 650, method 600 can proceed to step 680.

In step 620, the HLMS can determine whether the disable circuit block is to be inserted on an input port and/or an output port. If so, method 600 can proceed to step 655. If not, method 600 can continue to step 625. Continuing with step 655, the HLMS can locate the input port or the output port, or both the input port and the output port of the circuit design. The HLMS can select either one or both of the input port and output port. In step 660, the HLMS can insert a disable circuit block on one or more or all signals of the selected port, whether clock or data signals. In inserting the disable circuit block(s), the HLSM can make any necessary signal connections to and from each disable circuit block. After step 660, method 600 can proceed to step 680.

In step 625, the HLMS can determine whether the disable circuit block is to be inserted on the top "N" high fanout nets. If so, method 600 can proceed to step 665. If not, method 600 can proceed to step 630. Continuing with step 665, the HLMS can sort nets of the circuit design according to fanout of each net. In step 670, the HLMS can select a predetermined number of nets, e.g., "N" nets, with the highest fanout. In step 675, the HLMS can insert a disable circuit block on each selected net. For example, on a per net basis, the disable circuit block can be inserted after the source that outputs the high fanout output signal so that after insertion of the disable circuit block, each sink of the high fanout signal of the high fanout net is driven by the disable circuit block. As noted, inserting the disable circuit block(s) can include making any necessary signal connections to and from each disable circuit block. After step 675, method 600 can proceed to step 680.

Continuing with step 630, the HLMS can determine that the disable circuit block is to be inserted on reset signals of the circuit design. Accordingly, in step 635, the HLMS can locate one or more reset signals within the circuit design. In step 640, the HLMS can insert a disable circuit block on each selected reset signal. In inserting the disable circuit block(s), the HLMS can make any necessary signal connections to and from each disable circuit block. After step 640, method 600 can proceed to step 680.

In step 680, the HLMS can output the circuit design including the inserted disable circuit block(s) as an evaluation circuit design. As used herein, "outputting" and/or "output" can mean, for example, writing to a file, writing to a user display or other output device, storing in memory, sending or transmitting to another system, exporting, or the like.

The embodiments disclosed within this specification provide for the automated creation of evaluation circuit designs. The HLMS can automatically select a particular circuit block, e.g., a disable circuit block, for insertion into the circuit design that is to be transformed into the evaluation circuit design. The disable circuit block(s) inserted into the circuit design prevent unauthorized use of the circuit design by third parties. Further, the HLMS can select the location within the circuit design into which the disable circuit block is to be inserted.

The flowchart in the figures illustrates the architecture, functionality, and operation of possible implementations of systems, methods and computer program products according to various embodiments of the present invention. In this regard, each block in the flowchart may represent a module, segment, or portion of code, which comprises one or more portions of executable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustration, and combinations of blocks in the flowchart illustration, can be implemented by special purpose hardware-based systems that perform the specified functions or acts, or combinations of special purpose hardware and executable instructions.

Embodiments of the present invention can be realized in hardware or a combination of hardware and software. The embodiments can be realized in a centralized fashion in one system or in a distributed fashion where different elements are spread across several interconnected systems. Any kind of data processing system or other apparatus adapted for carrying out the methods described herein is suited.

Embodiments of the present invention further can be embedded in a device such as a computer program product, which comprises all the features enabling the implementation of the methods described herein. The device can include a data storage medium, e.g., a computer-usable or computer-readable medium, storing program code that, when loaded and executed in a system comprising memory and a processor, causes the system to perform the functions described herein. Examples of data storage media can include, but are not limited to, optical media, magnetic media, magneto-optical media, computer memory such as random access memory or hard disk(s), or the like.

The terms "computer program," "software," "application," "computer-usable program code," "program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The embodiments disclosed herein can be embodied in other forms without departing from the spirit or essential attributes thereof. Accordingly, reference should be made to the following claims, rather than to the foregoing specification, as indicating the scope of the embodiments of the present invention.

What is claimed is:

1. A method of creating evaluation hardware within an integrated circuit, the method comprising:
    determining, by a processor, a disable technique from a plurality of disable techniques according to an evaluation metric;
    automatically inserting, by the processor, a disable circuit block into the circuit design;
    wherein the inserted disable circuit block implements the determined disable technique; and
    storing, within a memory, the circuit design comprising the disable circuit block.

2. The method of claim 1,
    wherein the evaluation metric specifies a number of circuit elements of the circuit design rendered inoperable by each disable technique.

3. The method of claim 1, wherein the automatically inserting comprises:
    automatically selecting a location within the circuit design to insert the disable circuit block.

4. The method of claim 3, wherein the automatically inserting further comprises:
    selecting at least one clock enable signal within the circuit design; and
    inserting the disable circuit block on each selected clock enable signal within the circuit design.

5. The method of claim 3, wherein the automatically inserting further comprises:
    selecting at least one of an input port or an output port within the circuit design; and
    inserting the disable circuit block on each selected port.

6. The method of claim 3, wherein the automatically inserting further comprises:
    selecting a reset signal for at least one circuit element that stores state within the circuit design; and
    inserting the disable circuit block on each selected reset signal.

7. The method of claim 3, wherein the automatically inserting further comprises:
    sorting nets of the circuit design according to fanout;
    selecting a predetermined number of nets with highest fanout; and
    inserting the disable circuit block on at least one signal of each selected net.

8. The method of claim 1,
    wherein the evaluation metric specifies a number of disable circuit blocks inserted into the circuit design for each disable technique.

9. A system that creates evaluation hardware, comprising:
    a memory storing program code; and
    a processor coupled to the memory and executing the program code, wherein the processor performs executable steps comprising:
    determining a disable technique from a plurality of disable techniques according to an evaluation metric;
    automatically inserting a disable circuit block into the circuit design;
    wherein the inserted disable circuit block implements the determined disable technique; and
    storing, within the memory, the circuit design comprising the disable circuit block.

10. The system of claim 9,
    wherein the evaluation metric specifies a number of circuit elements of the circuit design rendered inoperable by each disable technique.

11. The system of claim 9, wherein the processor further performs an executable step comprising:
    automatically selecting a location within the circuit design to insert the disable circuit block.

12. The system of claim 11, wherein the automatically inserting comprises:
    selecting at least one clock enable signal within the circuit design; and
    inserting the disable circuit block on each selected clock enable signal within the circuit design.

13. The system of claim 11, wherein the automatically inserting comprises:
    selecting at least one of an input port or an output port within the circuit design; and
    inserting the disable circuit block on each selected port.

14. The system of claim 11, wherein the automatically inserting comprises:
    selecting a reset signal for at least one circuit element that stores state within the circuit design; and
    inserting the disable circuit block on each selected reset signal.

15. The system of claim 11, wherein the automatically inserting comprises:
    sorting nets of the circuit design according to fanout;
    selecting a predetermined number of nets with highest fanout; and
    inserting the disable circuit block on at least one signal of each selected net.

16. The system of claim 9, wherein the evaluation metric specifies a number of disable circuit blocks inserted into the circuit design for each disable technique.

17. A device, comprising:
    a data storage medium usable by a system comprising a processor and a memory, wherein the data storage medium stores program code that, when executed by the system, causes the system to execute operations comprising:
    automatically inserting a disable circuit block into the circuit design;

wherein the automatically inserting comprises:
sorting nets of the circuit design according to fanout;
selecting a predetermined number of nets with highest fanout; and
inserting the disable circuit block on at least one signal of each selected net; and
storing, within the memory, the circuit design comprising the disable circuit block.

18. The device of claim 17, wherein the automatically inserting comprises:
selecting at least one clock enable signal within the circuit design; and
inserting the disable circuit block on each selected clock enable signal within the circuit design.

19. The device of claim 17, wherein the automatically inserting comprises:
selecting at least one of an input port or an output port within the circuit design; and
inserting the disable circuit block on each selected port.

20. The device of claim 17, wherein the automatically inserting comprises:
selecting a reset signal for at least one circuit element that stores state within the circuit design; and
inserting the disable circuit block on each selected reset signal.

* * * * *